Patented Nov. 4, 1952

2,616,824

UNITED STATES PATENT OFFICE 2,616,824

METHOD OF EDGE GLUING WOOD VENEER SHEETS AND EDGE GLUED PRODUCT

John G. Meiler, Clarence D. Stone, and Robert J. Hilton, Tacoma, Wash., assignors to Plywood Research Foundation, Tacoma, Wash., a nonprofit corporation of Washington No Drawing. Application June 15, 1948, Serial No. 33,215

2 Claims. (Cl. 154—116)

The present invention relates to an adhesive for edge gluing, to a method of edge gluing and to an edge glued product. It relates particularly to an adhesive and method for edge gluing narrow veneers to form sheets suitable for use as core or back face stock in the manufacture of plywood or veneer furniture.

Adhesives and methods are known to the prior art for edge gluing strips of fine woods of uniform thickness to form sheets of veneer for use as face veneers in the manufacture of plywood and furniture. Scant attention has been paid, however, to the development of adhesives and methods suitable for use in edge gluing materials of lower value such as are used in the production of core veneers, back face veneers, the heavier pieces of wood used as backing for single face veneers such as are applied in the manufacture of various articles of furniture, and other lumber products. Such materials are designated herein simply as "core and back face stock."

A principal and obvious reason for this lack of attention has been the fact that the prior art edge gluing adhesives and methods have been too expensive to make economically attractive their application to low cost materials, the adhesives themselves being costly and the standard edge gluing procedures being expensive to effectuate because of the necessity of jointing (i. e., planing the edges of the veneers to make them straight and smooth) and otherwise processing the veneers to prepare them for the operation whereby they are joined in edge to edge relation. As a result, very substantial quantities of core and back face stock in the form of strips having a minimum width of about 2 inches currently are discarded or burned as fuel with attendant economic loss.

It is therefore a principal object of the present invention to provide an adhesive and practical method for joining narrow strips of material to form sheets suitable for use as core and back face stock in the production of plywood and furniture.

A further object of the present invention is the provision of a rapid, economical method for edge uniting narrow strips of material to form long, continuous sheets which may be used as core or back face veneers in the fabrication of plywood by continuous methods.

It is another object of the present invention to provide an adhesive and method for the manufacture of core veneers in the form of long, continuous sheets, the use of which leads to the formation of a plywood product which is free from the voids and overlaps which may be formed because of faulty aligning of the core veneers when individual plywood sheets are laid up for pressing in the conventional piece by piece method.

Still a further object of the present invention is the provision of an adhesive and method for edge uniting pieces of core or back face stock which is applicable regardless of whether the grain of one of two adjacent pieces runs perpendicular, parallel, or diagonally to the grain of the other.

It is another object of the present invention to provide an adhesive which is adaptable for use in joining strips of veneer in edge to edge relation without first planing the edges to be thus joined.

Still a further object of the present invention is the provision of an adhesive for use in edge gluing which will form a bond of sufficient strength and flexibility to form a composite sheet which may be handled in the mill by the methods and apparatus customarily employed in the manufacture of plywood and furniture.

Another object of the present invention is the provision of an adhesive which may be used in the edge to edge uniting of strips of wood to form a composite sheet, the component units of which are secured to each other through adhesive bonds which are stable and show no cold flow over the normal atmospheric temperature range, i. e., over a temperature range of between about 30° F. and about 110° F.

It is another object of the present invention to provide an adhesive for edge gluing which is economical and easily formulated from readily available raw materials.

Still a further object of the present invention is the provision of a composite sheet suitable for use as core and back face stock for the production of plywood and furniture and comprising a plurality of relatively narrow, unjointed strips of material glued together in edge to edge relation.

The provision of an adhesive composition which will accomplish the foregoing and other objects of the invention presents a difficult problem. Since the strips to be united have been dried with attendant shrinkage after having been cut in the veneer clipper or other agency used in their manufacture, and have not been squared or jointed in a separate operation, their edges are irregular and, when juxtaposed for the purpose of edge gluing, will touch each other in certain places but will be separated in others by distances of as much as one-eighth inch. The adhesive used to unite them, therefore, must serve both gap-filling and bonding functions and will form a relatively thick and heavy glue line.

Because of the foregoing factors, the thermosetting resins as a class are not well suited for the purposes of the present invention. These resins as a rule are not extendable with fillers and hence are relatively expensive for use with such low-cost materials as core and back face veneer stock. In addition, they are relatively hard and brittle when set, a factor which necessitates their use in amounts just sufficient to avoid starvation of the joint if optimum bonding is to be obtained. When the thermosetting resins are applied to irregular surfaces such as the juxtaposed edges of unjointed veneers in amounts sufficient to fill the spaces therebetween, the heavy glue line resulting upon setting of the adhesive is so brittle that the composite veneer sheet formed does not have the flexibility and strength required for handling in the mill. An adhesive which forms a tough, resilient bond is needed. Also required is an adhesive which will soften and flow at elevated temperatures so that any projections which may be present along the glue line will be flattened out by contact with the face veneer during the pressing operation without damage to the latter.

Although the thermoplastic resins have the desired quality of flow at elevated temperatures and certain of them have the toughness and resiliency necessary for the purposes of the invention, their use is attended by the difficulty that they tend to decompose when heated to a temperature sufficiently high to melt them and put them in a condition suitable for application to the material to be glued. If it is attempted to reduce their melting points by the expedients of admixing them with a suitable plasticizer, they become so soft and plastic as not to be suited for use. Hence, it is necessary to include in the formulation materials which will impart thereto or preserve therein the necessary qualities of strength and flexibility and the ability to retain these desirable qualities over the range of atmospheric temperatures which may be encountered in the average plywood mill or furniture factory, i. e., about 30° F. to 110° F.

It is a primary teaching of the present invention that an adhesive mixture meeting the foregoing requirements and suitable for use in edge gluing strips of unjointed core and back face stock broadly comprises; (1) a base resin comprising a tough, horny thermoplastic resin; (2) a plasticizer; (3) a hardening resin; and, preferably, (4) a modifying resin comprising a high molecular weight polystyrene. When materials of these classes are admixed in the manner outlined herein, they coact to form a thermoplastic edge glue mixture which overcomes the difficulties outlined above. The first constituent, the tough, horny thermoplastic resin, imparts to the mixture the required degree of toughness and resiliency. The second constituent, the plasticizer, reduces the melting point of the tough, horny thermoplastic resin so that it will soften or melt below its decomposition temperature and at a temperature suitable for application of the adhesive. The third constituent, the hard thermoplastic resin, imparts sufficient strength and rigidity to the mixture to overcome the softness and flexibility introduced by the plasticizer, although it is to be understood that it does not harden the final mixture by chemical reaction therewith in the sense that certain materials "cure" a thermosetting resin. The hardening resin also enhances the adhesive qualities of the mixture and, being relatively low in cost, serves an extending function. The final constituent, the high molecular weight polystyrene, modifies the properties of the mixture so that it has substantially no properties of brittleness or flow under tension over the usual range of atmospheric temperatures. More specifically, a typical formulation is as follows:

Table I

| | Parts by weight |
|---|---|
| Base resin (polyvinyl acetate) | 15–35 |
| Plasticizer (tricresyl phosphate) | 9–20 |
| Hardening resin (coumarone-indene-phenolic) | 45–70 |
| Modifying resin (high molecular weight polystyrene) | 0–1.5 |

Considering in greater detail the various constituents of the herein described adhesives for edge gluing:

The base of the adhesive mixtures of the invention is a thermoplastic resin of the class known to the trade and described in the technical literature as "tough" and "horny" in contradistinction to those which are "hard" and "brittle." These characteristics appear not to be correlatable with any particular property of the resins such as their molecular weight, melting point or viscosity, but rather to be determined by their chemical identity and, possibly, the nature of the molecular bonding occurring during the polymerization reactions by which they are formed. In general, however, their melting points are close to their decomposition temperatures so that they show no definite melting point but tend to decompose upon heating. Also, when placed in solvents in which they are soluble, they swell before dissolving.

After an investigation of a wide range of thermoplastic resins, the following have been found to be "tough, horny" thermoplastic resins within the meaning of the term as used in the resin art and in this specification: the polyvinyl resins, i. e., the polyvinyl ester resins, including polyvinyl acetate, polyvinyl chloride, polyvinyl chloroacetate, and copolymers of vinyl acetate and vinyl chloride; the polyvinyl ether resins, such as polyvinyl butyral; and the polyvinyl alcohol resins; the cellulose ethers and esters including ethyl cellulose, benzyl cellulose, cellulose acetate, and cellulose acetate-butyrate; the polyamide resins such as the ethylene diamine polyamide of dimerized and trimerized linoleic and linolenic acids; and polystyrene having a molecular weight within the approximate range of from 100,000 to 200,000 (see Meyer, Natural and Synthetic High Polymers, vol. IV, page 115, Table VIII (1942)). Of this group, the polyvinyl ester resins, particularly polyvinyl acetate are preferred. Suitable polyvinyl acetate resins are exemplified by the products currently marketed by the Bakelite Corporation under the trade names "Vinylite AYAB," "Vinylite AYAF" and "Vinylite AYAT," these having properties as given in Table II:

Table II

| | |
|---|---|
| Viscosity [1] | 2.5–21 |
| Softening point (°C.) | 44–86.5 |
| Specific gravity (20/20° C.) | 1.1191 |
| Refractive index (N$d$ 20° C.) | 1.4665 |
| Tensile strength (lbs./sq. in.) | 1,500–4,200 |

[1] In centipoises of 86.1 grams plus benzene to make 1 liter of solution.

A wide variety of plasticizing materials may be used in conjunction with the base resin to lower the melting point of the latter to acceptable limits. Suitable plasticizers which have the desired effect and are compatible with the other constituents of the mixture are, for example, the organic phosphates including trioctyl phosphate, triphenyl phosphate and tricresyl phosphate; the phthalate plasticizers including dibutyl phthalate and dioctyl phthalate; certain of the esters of the higher molecular weight fatty acids as dibutyl sebacate and tetrahydrofurfuryl oleate; and castor oil, both raw and blown. Certain compatible resinous materials of very low melting point, or those which are fluid at ordinary temperatures also have a plasticizing function and may be used to replace the above plasticizers in whole or in part in formulating the adhesive compositions of the invention. Such resinous materials are those which are viscous liquids or very tacky solids at room temperature such as, for example, the low molecular weight alkyd and coumarone type resins, and the liquid rosin esters and hydrogenated rosin esters, e. g. the methyl and ethyl esters. Also illustrative of the plasticizing resinous materials are the very low molecular weight polystyrenes, i. e. the polystyrenes having a molecular weight of up to about 3000 (see Meyer, supra). These various plasticizers may be used singly or in admixture with each other in amounts sufficient to reduce the melting point of the base resin until it may be melted without decomposition.

The third constituent of the adhesives of the invention, i. e., the hardening resin, in contradistinction to the tough, horny resin comprising the base resin thereof, is a member of the class of thermoplastic resins known to the trade and described in the technical literature as "hard, shatterable" resins. Although the property of hardness, like heat of toughness, does not appear to be correlatable with any of the usual chemical and physical properties of the resins with which it is associated, it imparts to the resins in which it is found, the characteristic of being shattered on impact with a solid object. In contradistinction to the base resins, the hardening resins melt before decomposing so that they are characterized by definable melting points, and, when placed in an appropriate solvent, they dissolve without swelling.

Hardening resins suitable for use in the instant invention belong in general to the following broad resin classes: the rosin type resins, including rosin itself as well as the rosin esters, modified or unmodified and hydrogenated or non-hydrogenated, which at ordinary temperatures are hard, brittle solids; the natural gums, such at Kauri gum, Manila gum, Shellac and Congo gum; the coumarone type resins, including the coumarone resins, the coumarone-indene resins and the coumarone-indene-phenolic resins; the alkyd resins which are hard and brittle at ordinary temperatures; the polyamide resins such as the ethylene diamine polyamide of dimerized and trimerized linoleic and linolenic acids; the thermoplastic phenol-aldehyde resinous materials, including the thermoplastic phenol-formaldehyde resins, cresol-formaldehyde resins, and phenol-furfuraldehyde resins; and the polystyrenes having a molecular weight within the range of between about 3000 and about 100,000 (see Meyer, supra). A typical resin for imparting rigidity to the thermoplastic compositions of the invention is "Nevillac Hard," a coumarone-indene-phenolic resinous product of the Neville Company of Pittsburgh, Pennsylvania, which has a melting range of from 85° C. to 95° C. and a specific gravity at 25° C. of 1.12 (see U. S. 2,263,213).

The foregoing hardening resins may be used singly or in admixture with each other in amounts sufficient to impart to the mixture the desired degree of hardness and adhesiveness. Since they are relatively low in cost, they may be used advantageously in substantial quantities to reduce the cost of the final composition.

Where it is attempted to reduce the brittleness of an adhesive bond by the expedient of adding a plasticizer to the ahesive mixture, it is often the result that the addition of sufficient plasticizer to make the bond non-brittle will cause it to be subject to flow under tension and hence not well suited for edge-gluing purposes. We have now discovered that this undesirable effect may be overcome by adding to the adhesive mixtures of the invention the modifying resin described herein. This material surprisingly and unexpectedly serves the function of a plasticizer in that it renders the adhesive bonds non-brittle, but without imparting to them the undesirable property of flow under tension. Its incorporation therefore makes possible the formulation of an adhesive applicable to the manufacture of edge glued products which are stable and substantially unaffected by temperature variations.

It has been found that a very high molecular weight polystyrene (molecular weight above about 200,000) is uniquely suitable for this purpose. Such a product is exemplified by that manufactured by the Pennsylvania Industrial Chemical Corporation under the trade name "Piccolastic Powder," which is a polystyrene having a molecular weight of about 600,000. It is effective in producing the desired result even though incorporated in relatively small proportions, amounts of up to about 1.5% by weight, based on the weight of the final composition, being sufficient.

The hereindescribed adhesive compositions are formulated by admixing the ingredients in the desired proportions at a temperature of between about 160° C. and about 220° C., which is sufficient to secure thorough mixing and to maintain the final compositions in a molten or fluid condition even after they have been placed in contact with the relatively cool surfaces of the core and back face stock to which they are applied. Since the base resin as a rule is soluble in the plasticizer only with difficulty, it is preferred first to melt the hardening resin, then to add thereto the base resin, with stirring until blending of these two constituents is complete, and then to add the plasticizer with continued stirring until it is dissolved in the mixture. Finally, the modifying resin, i. e., the high molecular weight polystyrene, is added and likewise blended into the composition. When a mixture of uniform composition has been obtained, it is ready for immediate application to the surfaces to be glued.

The adhesive compositions formulated as above described may be applied to the edges of narrow, unjointed strips of wood, regardless of whether the edge runs parallel to the grain, or perpendicularly or diagonally thereto. The strips may be of various species of woods, either hard or soft. The adhesive may be applied by any suitable method, as by dipping, roll-coating, brushing, or other method wherein the edge to be glued is brought into contact with a glue-applying surface. It is a particular feature of the invention that adhesive need be applied to one edge only of the two edges to be joined, the other edge receiving no preparatory treatment whatsoever. The two edges then are pressed together, this being done relatively promptly (e. g. within 1 to 10 seconds) after application of the adhesive to prevent "skinning" and to retain the adhesive qualities of the glue. They are held thus juxtaposed until the adhesive sets, which may require, for example, from ten to fifteen seconds. No special cooling is necessary during this period, although such may be supplied if it is desired to shorten the setting time, as might be desirable in continuous operation. By gluing together a plurality of narrow strips in edge to edge relation in this manner, it is possible to build a sheet of veneer of any desired or practical width and having sufficient strength and flexibility over the normal range of atmospheric temperatures to be handled by the usual machines and methods of the orthodox mill.

The method of edge gluing unjointed veneers described herein is particularly well suited for continuous application in edge gluing machines such as that described in the copending application of Dale L. Schubert for Edge Gluing Device Serial Number 33,049.

The invention is illustrated by the following examples:

EXAMPLE 1

An edge gluing adhesive was prepared, which had the following composition:

Table III

| | Parts by weight |
|---|---|
| Base resin ("Vinylite AYAT") | 28 |
| Plasticizer (tricresyl phosphate) | 16 |
| Hardening resin (coumarone-indene-phenolic type: "Nevillac Hard") | 55 |
| Modifying resin (high molecular weight polystyrene: "Piccolastic powder") | 1 |

The adhesive mixture was prepared by melting the Nevillac Hard, and adding thereto the Vinylite AYAT, tricresyl phosphate and the Piccolastic powder in the order named and with stirring to effect a uniform blending of the ingredients. During the mixing operation, the temperature of the mix was maintained at about 180–200° C. in order to keep it fluid.

While still in a molten condition, the adhesive mixture was applied to one edge of a strip of Douglas fir veneer ⅛ inch in thickness and about 4 inches in width, which had been formed by the usual clipping operation employed in the cutting of veneers and which had not been jointed or squared in order specially to prepare the edges for gluing. The strip then was placed in side by side relation to another similar strip to which no adhesive had been applied, and the juxtaposed edges pressed together so that any irregularities present therebetween were filled in by the adhesive, and a continuous joint was formed. The two strips were thus held, applying slight pressure, until the adhesive had hardened. With normal atmospheric cooling, this required from 10 to 15 seconds. Adhesive then was applied to an edge of the resulting composite sheet, and another strip of veneer joined thereto in the same manner. This sequence was repeated until the sheet formed had the desired dimensions, when it was ready for use as core or back face stock in the manufacture of plywood or veneer furniture.

The following examples illustrate the use of various vinyl ester resins as base resins, together with various plasticizers in the formulation of the herein described adhesive compositions, the methods of formulation and application of the mixture being substantially the same as that set forth in Example 1 (proportions being given in parts by weight):

Table IV

| Example Number | Base Resin | Plasticizer | Hardening Resin | Modifying Resin Polystyrene [13]: Mol. Wt. Above 200,000 |
|---|---|---|---|---|
| 2 | Vinyl acetate,[1] 28-30 | Tricresyl Phosphate, 8-12 | Coumarone-Indene-phenolic,[7] 54-56.5 | 1.2-1.5 |
| 3 | Vinyl acetate,[1] 26.8 | Castor Oil, "Baker P8," 20 | Coumarone-Indene-phenolic,[7] 53 | 3.2 |
| 4 | Vinyl acetate,[1] 32-30.8 | Dibutyl Phthalate, 16.4-16.8 | Coumarone-Indene-phenolic,[7] 51-52 | 0.6-0.4 |
| 5 | Vinyl acetate,[1] 21.2-26.2 | Dibutyl Phthalate, 13.2-14 | Coumatone-Indene-phenolic,[7] 59-65.1 | 0.5-0.8 |
| 6 | Vinyl acetate,[1] 33 | Dibutyl Sebacate, 13.3 | Coumarone-Indene-phenolic,[8] 53 | 0.7 |
| 7 | Vinyl acetate,[2] 14 | Dibutyl Phthalate, 10 | Coumarone-Indene-phenolic,[7] 48 | 1 |
| 8 | Vinyl acetate,[1] 25 | Stearic Acid, "Zeco 37," 25 | Coumarone-Indene-phenolic,[14] 50 | |
| 9 | Vinyl acetate,[1] 28.7 | Dibutyl Phthalate, 14.3 | Coumarone-Indene-phenolic,[7] 57 | |
| 10 | Vinyl acetate,[1] 21 | Dibutyl Sebacate, 12 | {Coumarone-Indene-phenolic,[7] 58 / Rosin Glycerol Ester,[9] 9} | |
| 11 | Vinyl chloride,[3] 16.5 | Dibutyl Sebacate, 8.8 | Alkyd Resin,[10] 74 | 0.7 |
| 12 | Vinyl chloride,[3] 27 | Tricresyl Phosphate, 30 | Alkyd Resin,[11] 43 | |
| 13 | {Polyvinyl acetal,[4] 5 / Polystyrene [5] (Mol. Wt. 100,000 to 200,000), 28.5} | Liquid Coumarone-Indene-phenolic,[6] 26 | Polystyrene,[12] (Mol. Wt. 3,000-100,000), 9 | 1.3 |

[1] "Vinylite AYAT"—Bakelite Corporation.
[2] "Vinylite AYAB"—Bakelite Corporation.
[3] "Vinylite VYHH"—Bakelite Corporation.
[4] "Alvar 13-80"—Shawinigan Chemicals Corp.
[5] "Piccolastic A5"—Industrial Chemicals Corp.
[6] "Nevillac 10°"—The Neville Company.
[7] "Nevillac Hard"—The Neville Company.
[8] "Nevillac RP"—The Neville Company.
[9] "Stayvellite 10"—Hercules Powder Company.
[10] "Neolyn 40"—Hercules Powder Company.
[11] "Neolyn 23"—Hercules Powder Company.
[12] "Piccolastic C-125"—Industrial Chemicals Corp.
[13] "Piccolastic Podwer"—Industrial Chemicals Corp.
[14] "Nevillac Soft"—The Neville Company.

Examples of the formulations of the invention incorporating base resins other than the polyvinyl ester resins are the following, the method of compounding and of application again being substantially the same as those set forth in Example 1 (proportions being given in parts by weight):

Table V

| Example Number | Base Resin | Plasticizer | Hardening Resin |
|---|---|---|---|
| 14 | Ethyl Cellulose, 31.25 | Dioctyl Phthalate, 6.25 | Polystyrene [4] (Mol. Wt. 3,000-100,000) 62.5. |
| 15 | Ethyl Cellulose, 28-40 | Dibutyl Sebacate, 10-12 | Rosin, 50-60. |
| 16 | Benzyl Cellulose, 23 | Hydrogenated Rosin, Methyl Ester,[2] 27. | Rosin, 50. |
| 17 | Benzyl Cellulose, 21 | Hydrogenated Rosin Methyl Ester,[2] 25. | Coumarone-Indene-phenolic,[5] 54. |
| 18 | Benzyl Cellulose, 23 | Hydrogenated Rosin Methyl Ester,[2] 27. | Ester gum, 50. |
| 19 | Benzyl Cellulose, 27-45 | Coumarone-Indene phenolic,[6] 23-27. | Ester gum, 50-55. |
| 20 | Cellulose Acetate-Butyrate Ethyl Cellulose, 33. | Rosin Merhyl Ester,[3] 8 | Rosin, 52. |
| 21 | Ethyl Cellulose, 25-54 | Dioctyl Phthalate, 25-75 | Phenol-Aldehyde Resin,[7] 50-38.5. |
| 22 | Polyamide,[1] 95 | Liquid Coumarene-Indene-phenolic,[6] 5. | |
| 23 | Polyvinyl Butyral,[8] 18.4 | Polystyrene [9] (Mol. Wt. below 3,000), 51. | Polystyrene [4] Mol. Wt. 3,000-100,000), 25. Polystyrene [10] Mol. Wt. 3,000-100,000), 3.1. |

[1] "Polyamide #94"—General Mills: the ethylene diamine polyamide of dimerized and trimerized linoleic and linolenic acids.
[2] "Hercolyn"—The Hercules Powder Co.
[3] "Abalyn"—The Hercules Powder Co.
[4] "Piccolastic A50"—Industrial Chemicals Co.
[5] "Nevillac"—The Neville Company.
[6] "Nevilac 10°"—The Neville Company.
[7] "Bakelite 2000"—The Bakelite Corp.: Solid thermoplastic phenol-formaldehyde resin.
[8] "Butacite"—The Velsicol Corp.
[9] "Piccolastic A5"—Industrial Chemical Co.
[10] "Piccolastic C125"—Industrial Chemical Co.

The product resulting from the application of the foregoing adhesive compositions to the edge gluing of unjointed, narrow strips of core and back face stock is a composite sheet comprising a plurality of strips united through substantially continuous adhesive bonds which are tough, flexible and of sufficient strength to make possible the handling of the sheet by the methods and apparatus customarily used in the fabrication of plywood and furniture veneers. Although a thermoplastic resinous mixture is employed, its properties are such that it does not soften and flow at temperatures within the normal atmospheric temperature range, and hence the bonds will remain hard and not demonstrate the undesirable property of flow under tension. The adhesives are easily formulated, relatively inexpensive, and readily applied by methods and apparatus adaptable to continuous operation. Their use leads to the production of long, continuous sheets which are free from voids between the component strips, free from marginal overlaps, and well suited for application as core or back face veneers in the production of plywood by continuous methods. There thus is afforded a practical means for utilizing profitably the large quantities of narrow strips of veneer which heretofore have been discarded as a waste product.

Having now described our invention in preferred embodiments, what we claim as new and desire to protect by Letters Patent is:

1. The method of edge gluing veneers which comprises applying a thermoplastic resin adhesive in a softened condition to an edge of at least one veneer strip, placing the edge of another veneer strip in contact with the edge to which adhesive has been applied, and holding the juxtaposed edges in contact with each other for a period of time sufficient to harden the adhesive, said thermoplastic resin adhesive comprising about 28 parts polyvinyl acetate, about 16 parts tricresyl phosphate, about 55 parts coumarone-indene-phenolic resin and about 1 part polystyrene (molecular weight above about 200,000), parts being expressed as parts by weight.

2. As a new article of manufacture, a composite veneer sheet comprising a plurality of strips of veneer joined together in edge to edge relation by means of an adhesive comprising about 28 parts polyvinyl acetate, about 16 parts tricresyl phosphate, about 55 parts coumarone-indene-phenolic resin, and about 1 part polystyrene (molecular weight above about 200,000), parts being expressed as parts by weight.

JOHN G. MEILER.
CLARENCE D. STONE.
ROBERT J. HILTON.

REFERENCES CITED

The following references are of record in the file of this patent:

UNITED STATES PATENTS

| Number | Name | Date |
|---|---|---|
| 2,147,772 | Kallander | Feb. 29, 1939 |
| 2,174,885 | Kallander | Oct. 9, 1939 |
| 2,211,689 | Dittmar | Aug. 13, 1940 |
| 2,247,154 | Geiger et al. | June 24, 1941 |
| 2,300,728 | Goss | Nov. 3, 1942 |
| 2,306,151 | Bailey | Dec. 22, 1942 |
| 2,312,652 | Komives et al. | Mar. 2, 1943 |
| 2,344,488 | Bowling | Mar. 21, 1944 |
| 2,378,244 | Pfenning | June 12, 1945 |
| 2,419,880 | Blyler et al. | Apr. 29, 1947 |
| 2,481,896 | Ziegler | Sept. 13, 1949 |

OTHER REFERENCES

"Neville Resins and Plasticizers," pamphlet published in 1945 by the Neville Co., Pittsburgh 25, Pa., pp. 18, 19, 27, 28 and 38.